US012551925B2

(12) United States Patent
Jin et al.

(10) Patent No.: US 12,551,925 B2
(45) Date of Patent: Feb. 17, 2026

(54) ULTRASONIC TRANSDUCER

(71) Applicant: ELECTRONICS AND TELECOMMUNICATIONS RESEARCH INSTITUTE, Daejeon (KR)

(72) Inventors: Hanbit Jin, Daejeon (KR); Hye Jin Kim, Daejeon (KR); Chan-Hwa Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 214 days.

(21) Appl. No.: 18/505,370

(22) Filed: Nov. 9, 2023

(65) Prior Publication Data

US 2024/0165662 A1 May 23, 2024

(30) Foreign Application Priority Data

Nov. 21, 2022 (KR) .................. KR10-2022-0156678
Oct. 25, 2023 (KR) .................. KR10-2023-0144199

(51) Int. Cl.
*B06B 1/02* (2006.01)

(52) U.S. Cl.
CPC .................................... *B06B 1/02* (2013.01)

(58) Field of Classification Search
CPC ................................. B06B 1/02; G10K 11/32
See application file for complete search history.

(56) References Cited

U.S. PATENT DOCUMENTS

| | | | | |
|---|---|---|---|---|
| 2002/0061117 | A1 | 5/2002 | Takewa et al. | |
| 2006/0066184 | A1* | 3/2006 | Sawada | B06B 1/0633 310/369 |
| 2010/0020990 | A1 | 1/2010 | Moon et al. | |
| 2020/0376520 | A1 | 12/2020 | Chen et al. | |
| 2023/0192472 | A1 | 6/2023 | Wang et al. | |

FOREIGN PATENT DOCUMENTS

| | | | | |
|---|---|---|---|---|
| CN | 108543689 | A * | 9/2018 | B06B 1/0651 |
| CN | 216852338 | U | 6/2022 | |
| JP | 2002-315095 | A | 10/2002 | |
| KR | 10-2010-0010778 | A | 2/2010 | |

OTHER PUBLICATIONS

CN-108543689-A_translate (Year: 2018).*
Mario Kupnik et al., "Air Coupled Ultrasonic Transducers for Industrial Applications", Technische Universitat Darmstadt, 2019.

* cited by examiner

*Primary Examiner* — Tulsidas C Patel
*Assistant Examiner* — Mohammed Ahmed Qureshi
(74) *Attorney, Agent, or Firm* — LRK PATENT LAW FIRM

(57) ABSTRACT

Provided is an ultrasonic transducer. This ultrasonic transducer includes a vibration plate and a radiation plate provided on the vibration plate. The radiation plate may have arc holes, arc grooves, or concave-convex grooves.

10 Claims, 8 Drawing Sheets

ULTRASONIC TRANSDUCER

CROSS-REFERENCE TO RELATED APPLICATIONS

This U.S. non-provisional patent application claims priority under 35 U.S.C. § 119 of Korean Patent Application Nos. 10-2022-0156678, filed on Nov. 21, 2022, and 10-2023-0144199, filed on Oct. 25, 2023, the entire contents of which are hereby incorporated by reference.

BACKGROUND

1. Field of the Invention

The present disclosure herein relates to a transducer, and more specifically, to a beam angle control type ultrasonic transducer.

2. Description of Related Art

Generally, when performing the ultrasonic array beamforming for producing mid-air haptic sensing, a grating lobe of the same size as a main lobe is generated due to a spacing between elements, and thus there is a limit to forming a focal point only in a desired space. As one way to solve this limitation, a method of minimizing the grating lobe by manufacturing an ultrasonic element in a miniaturized size of λ/2 was proposed. However, when the ultrasonic element size is reduced, a limitation in that an output sound pressure of the ultrasonic element also decreases under the same voltage application conditions occurs, and thus there were the disadvantages of increasing power consumption by increasing a driving voltage in order to increase the output sound pressure and difficulty in generating mid-air haptic sensing patterns due to the lack of ultrasonic output sound pressure.

SUMMARY

The present disclosure provides an ultrasonic transducer that may increase output efficiency of ultrasonic waves.

An embodiment of the inventive concept provides an ultrasonic transducer. This ultrasonic transducer includes a vibration plate and a radiation plate provided on the vibration plate. Here, the radiation plate may have arc holes, arc grooves, or concave-convex grooves.

In an embodiment, the ultrasonic transducer may further include arc sectors provided in the arc holes or the arc grooves of the radiation plate.

In an embodiment, the arc sectors may include inner arc sectors and outer arc sectors provided outside the inner arc sectors.

In an embodiment, the number of arc sectors may be four.

In an embodiment, each of the arc sectors may have an arc angle greater than 15 degrees.

In an embodiment, the arc angle may be less than 25 degrees.

In an embodiment, the arc angle may be 20 degrees.

In an embodiment, the arc holes may include internal arc holes and external arc holes outside the internal arc holes.

In an embodiment, each of the concave-convex grooves may have a ring shape.

In an embodiment, the concave-convex grooves may include an internal concave-convex groove and an external concave-convex groove outside the inner concave-convex groove.

In an embodiment, the radiation plate may have a propeller shape.

In an embodiment of the inventive concept, an ultrasonic transducer includes vibration plates and a radiation plate on the vibration plates. Here, the vibration plates may be arranged in an azimuth direction of the radiation plate.

In an embodiment, the radiation plate may include a metal plate.

In an embodiment, the radiation plate may include an elastic material.

In an embodiment, the vibration plates may include ceramic.

In an embodiment, each of the vibration plates may have an arc angle less than 90 degrees.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
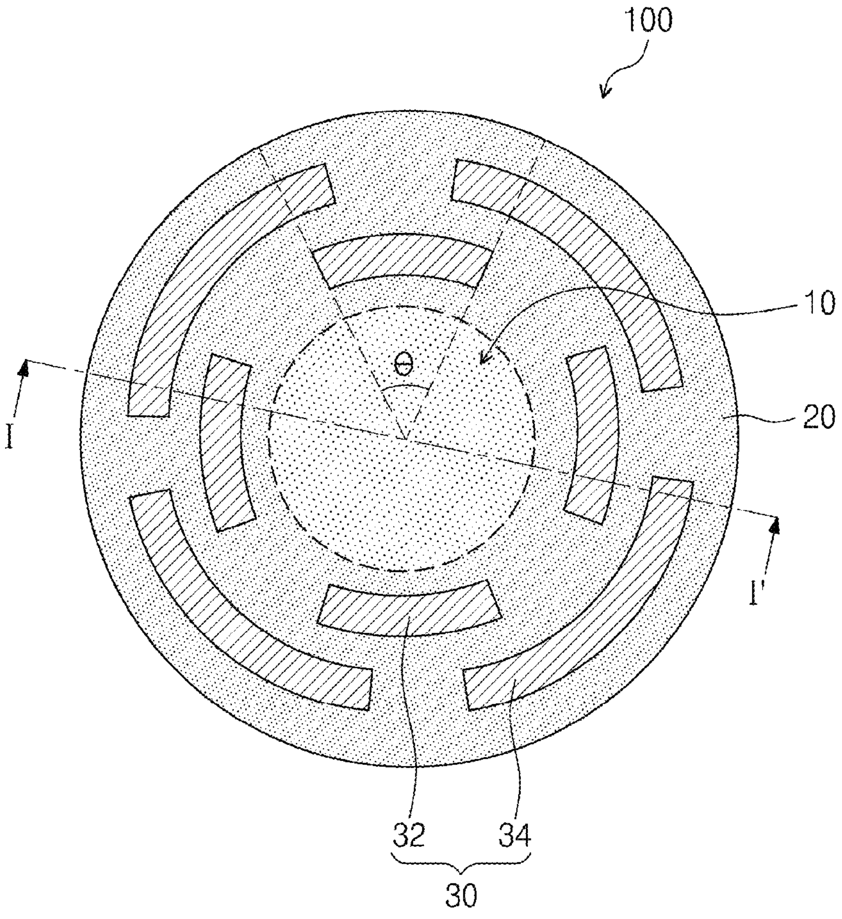
FIG. 1 is a plan view showing an example of an ultrasonic transducer according to an embodiment of the inventive concept.

Hereinafter, embodiments of the inventive concept will be described in more detail with reference to the accompanying drawings. The advantages and features of an embodiment of the inventive concept and methods for achieving them will become clear by referring to an embodiment described in detail below in conjunction with the accompanying drawings. However, an embodiment of the inventive concept is not limited to an embodiment described herein and may be embodied in different forms. Rather, an embodiment introduced herein is provided so that the disclosed content will be thorough and complete, and will fully convey the scope of the inventive concept to those skilled in the art, and an embodiment of the inventive concept is defined only by the scope of the claims. The same reference numerals refer to the same elements throughout the specification.

The terms used in this specification are for describing embodiments and are not intended to limit an embodiment of the inventive concept. As used herein, singular forms are intended to include the plural forms as well, unless the context clearly indicates otherwise. It will be understood that the terms "comprises" and/or "comprising", when used in this specification, specify the presence of stated components, operations and/or elements, but do not preclude the presence or addition of one or more other components, operations and/or elements thereof. In addition, since this is according to an embodiment, reference numerals presented according to the order of description are not necessarily limited to that order.

In addition, embodiments described in this specification will be described with reference to cross-sectional views and/or plan views, which are ideal illustrations of an embodiment of the inventive concept. In the drawings, the thicknesses of films and regions are exaggerated for clarity of illustration of technical content. Accordingly, the form of the illustration may be modified depending on manufacturing technology and/or tolerance. Accordingly, embodiments of the inventive concept are not limited to the specific form shown, but also include changes in form produced according to the manufacturing process.

Figure 2:
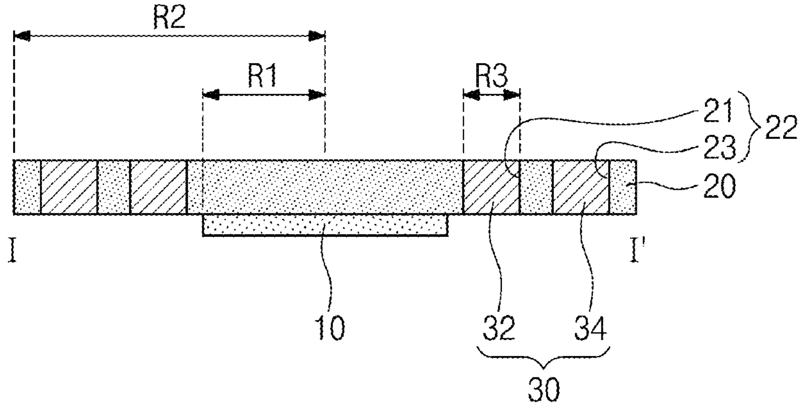
FIG. 2 is a cross-sectional view taken along line I-I' of FIG. 1.

FIG. 1 shows an example of an ultrasonic transducer 100 according to an embodiment of the inventive concept. FIG. 2 shows a cross section taken along line I-I' of FIG. 1.

Referring to FIGS. 1 and 2, the ultrasonic transducer 100 of an embodiment of the inventive concept may be an ultrasonic transducer for mid-air haptic sensing. In an embodiment, the ultrasonic transducer 100 of an embodiment of the inventive concept may include a vibration plate 10, a radiation plate 20, and arc sectors 30.

The vibration plate 10 may support the radiation plate 20. The vibration plate 10 may generate a vibration signal using an electric signal. The vibration signal may be ultrasonic. The vibration plate 10 may have a circular or disk shape in plan view. The vibration plate 10 may have a first radius R1 of about 1 mm to about 10 cm. The vibration plate 10 may include a metal oxide ceramic.

The radiation plate 20 may be provided on the vibration plate 10. The radiation plate 20 may have a shape similar to the vibration plate 10. The radiation plate 20 may have a circular or disk shape in plan view. The radiation plate 20 may be wider than the vibration plate 10. The radiation plate 20 may have a second radius R2 that is larger than the first radius R1 of the vibration plate 10. The second radius R2 may be greater than about 1 mm and less than about 20 cm. The radiation plate 20 may include metal. In an embodiment, the radiation plate 20 may have arc holes 22. Each of the arc holes 22 may have a rounded line shape in plan view. The arc holes 22 may be arranged in an azimuthal direction of the radiation plate 20. For example, the arc holes 22 may include internal arc holes 21 and external arc holes 23. The internal arc holes 21 may be provided adjacent to the center of the radiation plate 20. The external arc holes 23 may be provided outside the internal arc holes 21. The external arc holes 23 may be provided adjacent to an edge of the radiation plate 20. The external arc holes 23 may be longer than the internal arc holes 21 in the azimuthal direction of the radiation plate 20. Each of the inner arc holes 21 and the outer arc holes 23 may be composed of about four holes. The internal arc holes 21 and external arc holes 23 may be arranged to be misaligned in a radial direction of the radiation plate 20.

The arc sectors 30 may be provided in the inner arc holes 21 and outer arc holes 23 of the radiation plate 20. The arc sectors 30 may have a thickness equal to the thickness of the radiation plate 20. Each of the arc sectors 30 may have an arc angle θ of greater than about 15 degrees and less than about 30 degrees. The arc angle θ may be about 20 degrees. The arc sectors 30 may include a material different from that of the radiation plate 20. The arc sectors 30 may include a highly elastic material such as a polymer of PDMS. Each of the arc sectors 30 may have a third radius R3 that is smaller than the first radius R1 and the second radius R2. The arc sectors 30 may increase the output efficiency of ultrasonic waves by generating an effect of increasing the displacement of the radiation plate. In an embodiment, the arc sectors 30 may include inner arc sectors 32 and outer arc sectors 34. The internal arc sectors 32 may be provided within the internal arc holes 21. The external arc sectors 34 may be provided within the external arc holes 23.

Accordingly, the ultrasonic transducer 100 of an embodiment of the inventive concept may increase the output efficiency of ultrasonic waves by generating the effect of increasing the displacement of the radiation plate 20 by using the arc sectors 30 within the arc holes 22 of the radiation plate 20.

Figure 3:
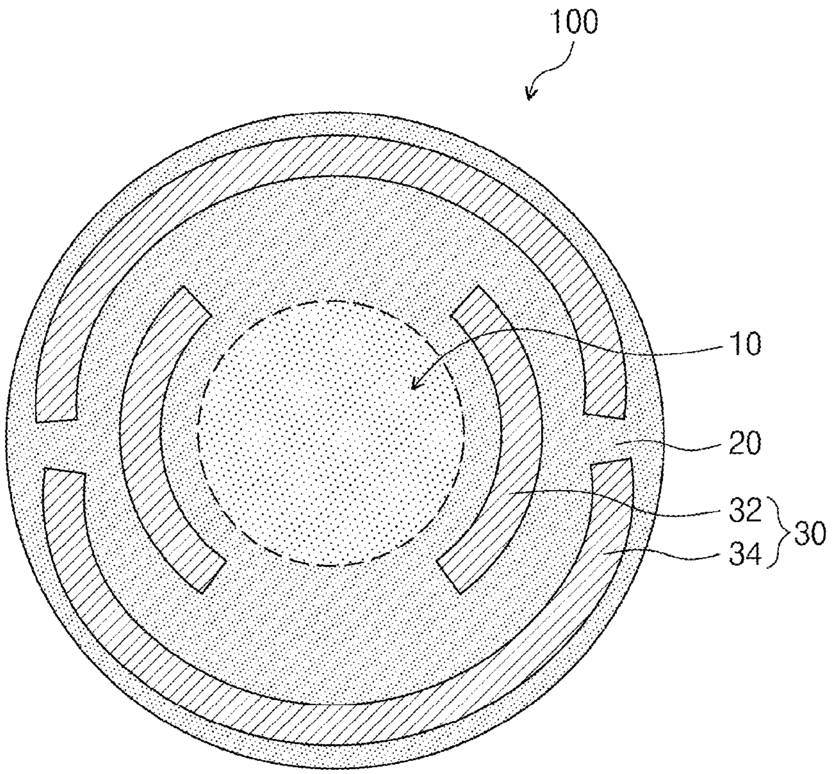
FIG. 3 is a plan view showing an example of an ultrasonic transducer according to an embodiment of the inventive concept.

FIG. 3 shows an example of the ultrasonic transducer 100 according to an embodiment of the inventive concept.

Referring to FIG. 3, each of the inner arc sectors 32 and the outer arc sectors 34 within the radiation plate 20 may be composed of about two sectors.

Figure 4:
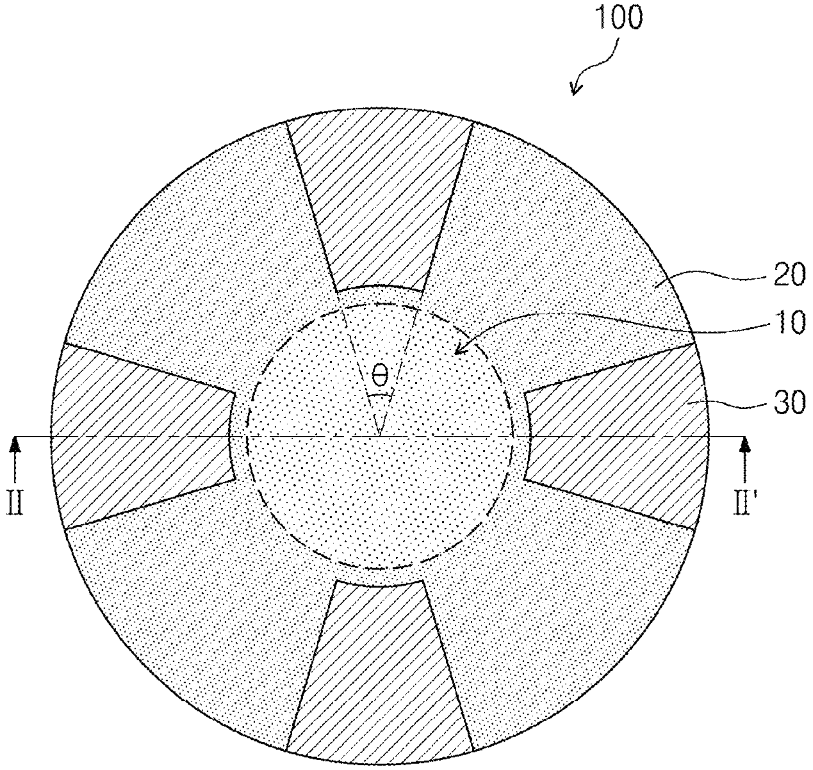
FIG. 4 is a plan view showing an example of an ultrasonic transducer according to an embodiment of the inventive concept.
Figure 5:
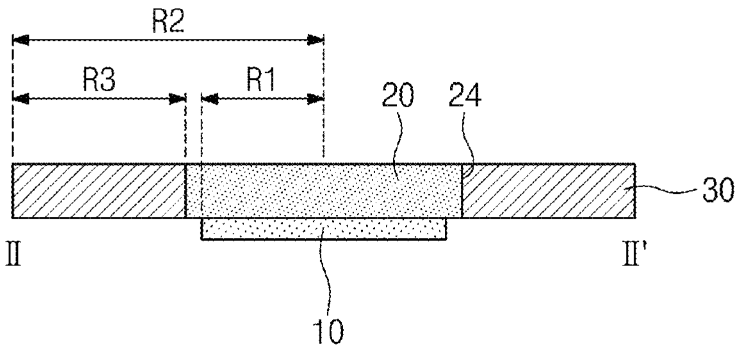
FIG. 5 is a cross-sectional view taken along line II-II' of FIG. 4.

FIG. 4 shows an example of the ultrasonic transducer 100 according to an embodiment of the inventive concept. FIG. 5 shows a cross section taken along line II-II' of FIG. 4.

Referring to FIGS. 4 and 5, the radiation plate 20 may have a propeller shape in plan view. In an embodiment, the radiation plate 20 may have arc grooves 24. The arc grooves 24 may be arranged in the direction of the radiation plate 20 and may be composed of about four grooves.

The arc sectors 30 may be provided within the arc grooves 24. The arc sectors 30 may be provided between wings of the radiation plate 20 on both sides of the arc grooves 24. Each of the arc sectors 30 may have the third radius R3 that is smaller than the second radius R2 and larger than the first radius R1.

Figure 6:
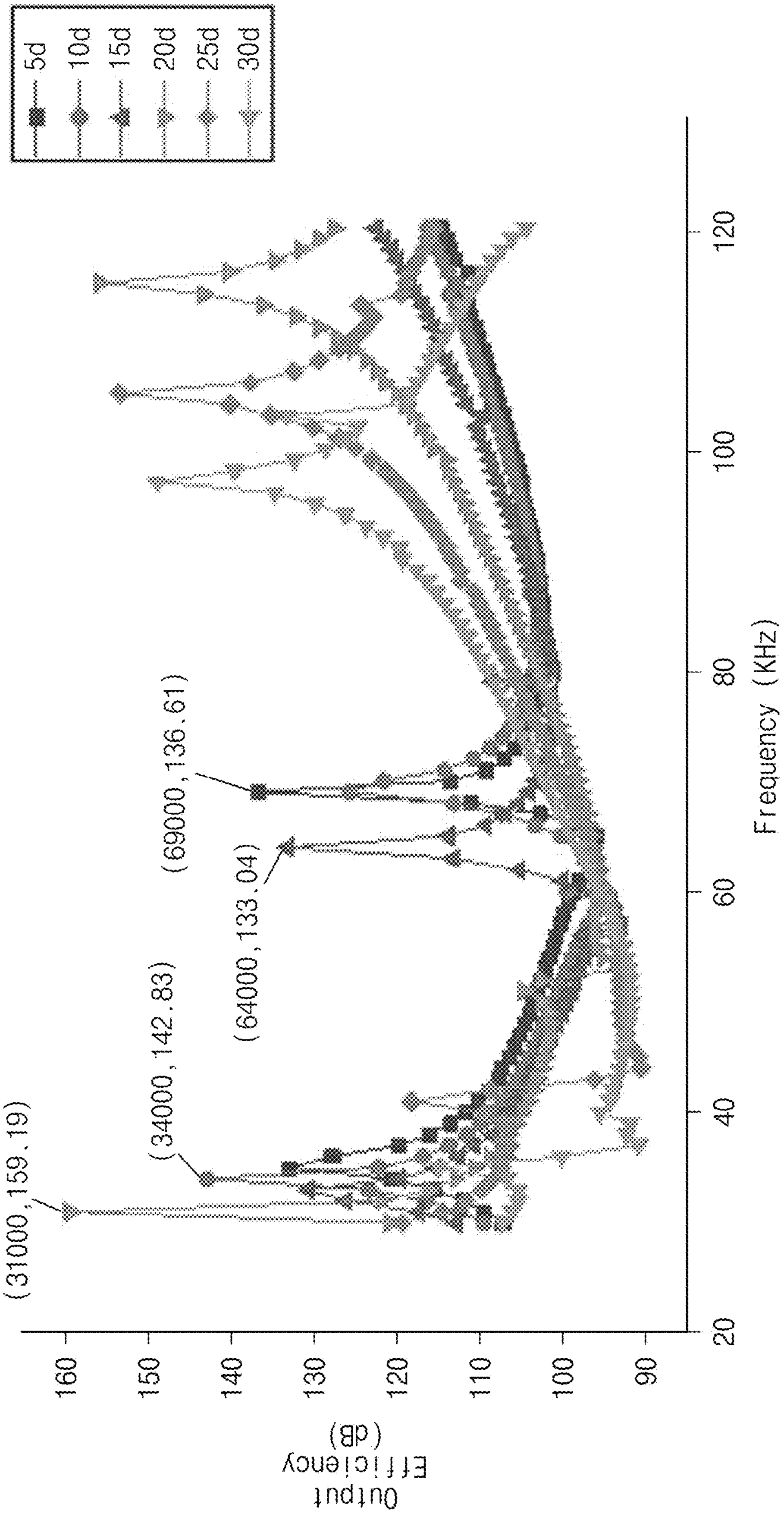
FIG. 6 is a graph showing radiation efficiency according to a frequency of ultrasonic waves generated by a vibration plate of FIG. 1 and an arc angle.

FIG. 6 shows the radiation efficiency according to the frequency of ultrasonic waves generated by the vibration plate 10 of FIG. 1 and an arc angle θ.

Referring to FIG. 6, the arc sectors 34 having an arc angle θ of about 5 degrees to about 30 degrees may have radiation peak efficiencies for ultrasonic waves having a frequency of about 30 KHz to about 120 KHz. The arc sectors 34 having an arc angle θ of about 5 degrees may have a peak radiation efficiency of about 136.1 dB for ultrasonic waves having a frequency of about 70 KHz. The arc sectors 34 having an arc angle θ of about of about 10 degrees may have a peak radiation efficiency of about 142.83 dB for ultrasonic waves having a frequency of about 33 KHz. The arc sectors 34 having an arc angle θ of about 15 degrees may have a peak radiation efficiency of about 133.04 dB for ultrasonic waves having a frequency of about 65 KHz. The arc sectors 34 having an arc angle θ of about 20 degrees may have a peak radiation efficiency of about 159.19 dB for ultrasonic waves having a frequency of about 30 KHz. The arc sectors 34 having an arc angle θ of about 25 degrees may have a peak radiation efficiency of about 153 dB for ultrasonic waves having a frequency of about 105 KHz. The arc sectors 34 having an arc angle θ of about 30 degrees may have a peak radiation efficiency of about 150 dB for ultrasonic waves having a frequency of about 95 KHz.

Figure 7:
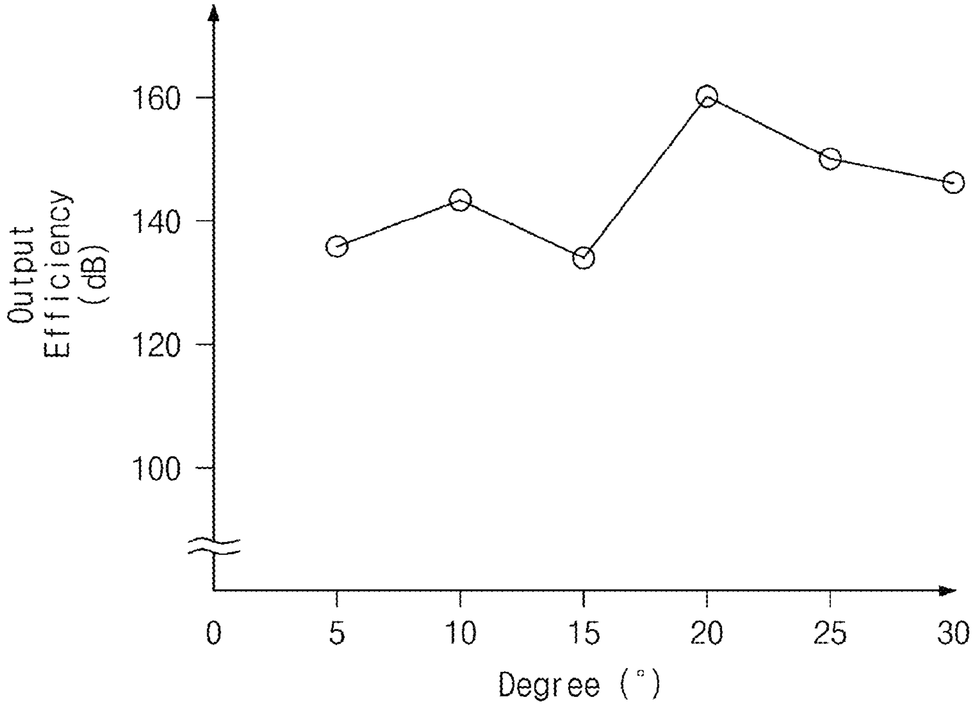
FIG. 7 is a graph showing radiation peak efficiency according to an arc angle of arc sectors of FIGS. 1 and 4.

FIG. 7 shows the radiation peak efficiency depending on the arc angle θ of the arc sectors 34 of FIGS. 1 and 4.

Referring to FIG. 7, when the arc angle θ is greater than about 15 degrees and less than 25 degrees, the arc sectors 34 may output ultrasonic waves with high radiation efficiency. The arc sectors 34 having the arc angle θ of about 20 degrees may output ultrasonic waves with maximum radiation efficiency.

Figure 8:
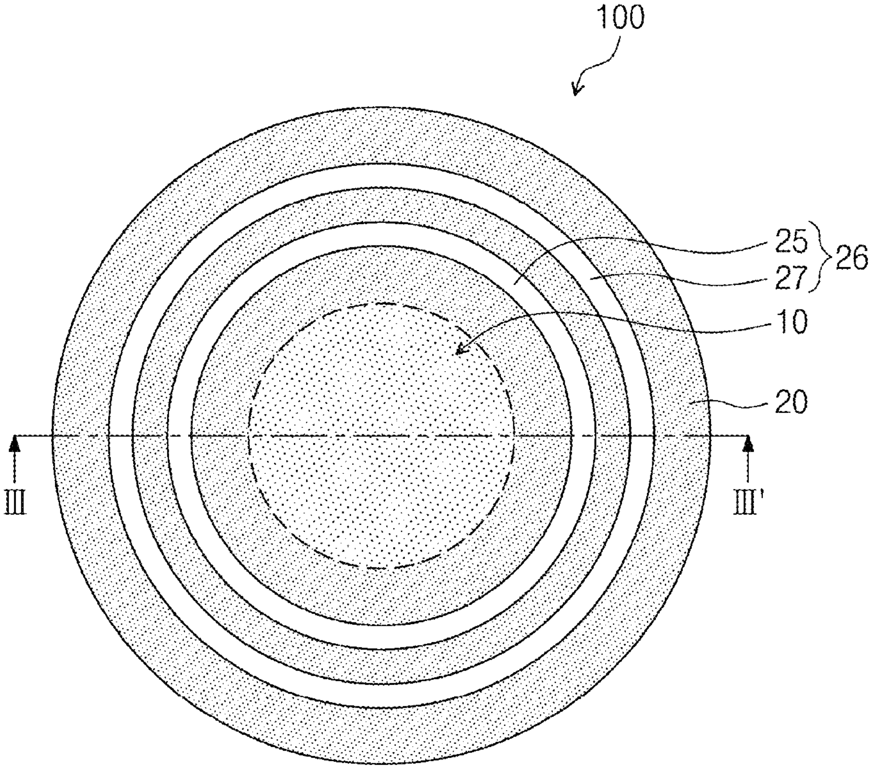
FIG. 8 is a plan view showing an example of an ultrasonic transducer according to an embodiment of the inventive concept.
Figure 9:
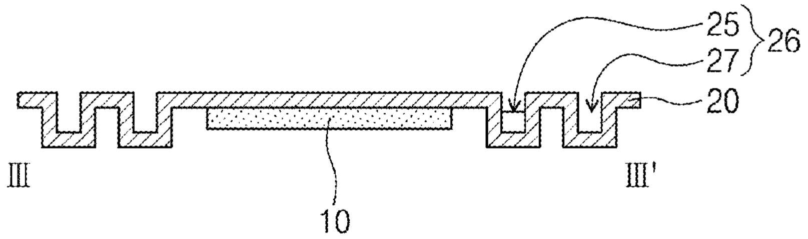
FIG. 9 is a cross-sectional view taken along line III-III' of FIG. 8.

FIG. 8 shows an example of the ultrasonic transducer 100 according to an embodiment of the inventive concept. FIG. 9 shows a cross section taken along line III-III' of FIG. 8.

Referring to FIGS. 8 and 9, the radiation plate 20 may have concave-convex grooves 26. Each of the concave-convex grooves 26 may have a ring shape in plan view. The concave-convex grooves 26 may be provided outside the vibration plate 10. The concave-convex grooves 26 may increase the ultrasonic radiation efficiency of the radiation plate 20. In an embodiment, the concave-convex grooves 26 may include an internal concave-convex groove 25 and an external concave-convex groove 27. The internal concave-convex groove 25 may surround an outer peripheral surface of the vibration plate 10. The external concave-convex groove 27 may surround an outer edge of the internal concave-convex groove 25.

Figure 10:
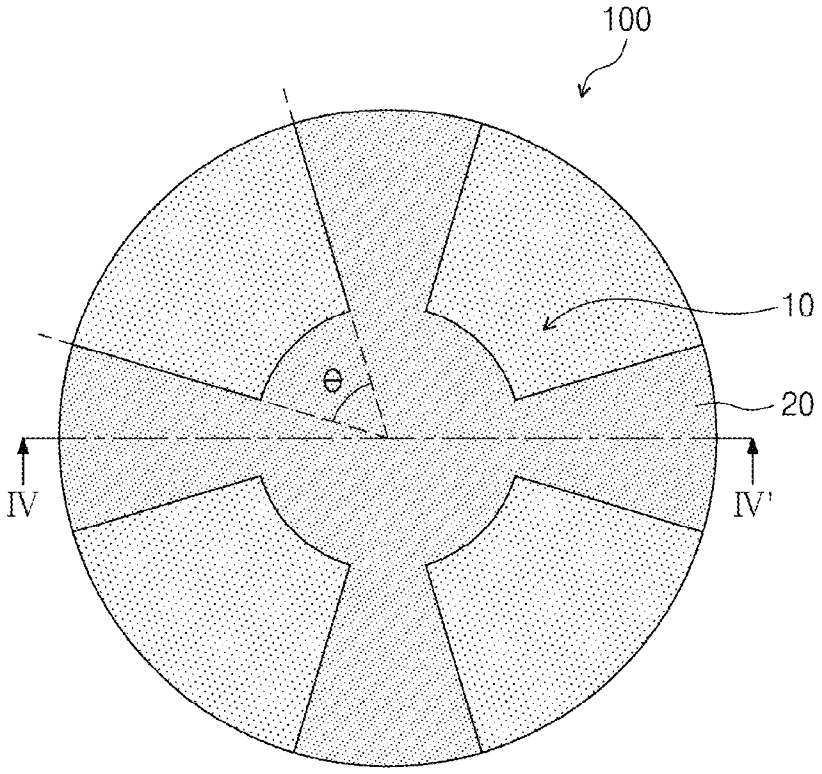
FIG. 10 is a plan view showing an example of an ultrasonic transducer according to an embodiment of the inventive concept.
Figure 11:
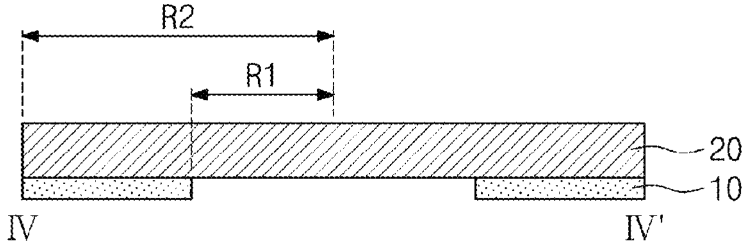
FIG. 11 is a cross-sectional view taken along line IV-IV' in FIG. 10.

FIG. 10 shows an example of the ultrasonic transducer 100 according to an embodiment of the inventive concept. FIG. 11 shows a cross section taken along line IV-IV' of FIG. 10.

Referring to FIGS. 10 and 11, the vibration plates 10 may be arranged in the azimuth direction of the radiation plate 20. Each of the vibration plates 10 may include an arc block. The vibration plates 10 may be composed of about four plates. Each of the vibration plates 10 may have an arc angle of less than about 90 degrees.

Figure 12:
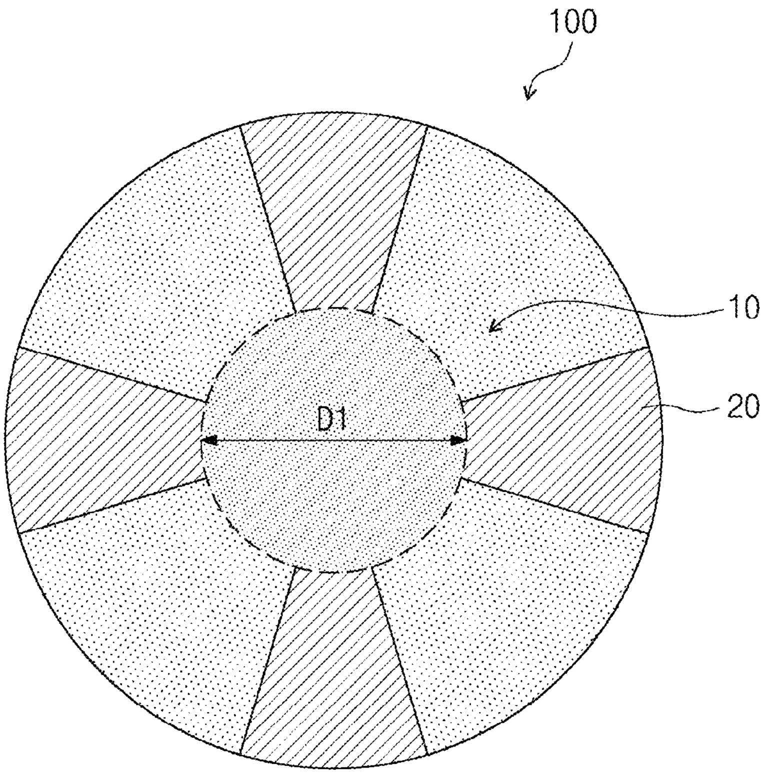
FIG. 12 is a plan view showing an example of an ultrasonic transducer according to an embodiment of the inventive concept.

FIG. 12 shows an example of the ultrasonic transducer 100 according to an embodiment of the inventive concept.

Referring to FIG. 12, the radiation plate 20 may include a highly elastic material, unlike the metal plate of FIGS. 1, 3, 4, and 10.

As described above, the ultrasonic transducer according to an embodiment of the inventive concept may increase the output efficiency of ultrasonic waves by generating an effect of increasing the displacement of the radiation plate using the arc sectors within the arc holes and arc grooves of the radiation plate.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. An ultrasonic transducer comprising:

a vibration plate;

a radiation plate provided on the vibration plate, the radiation plate having arc holes, arc grooves, or concavo-convex grooves; and arc sectors provided in the arc holes or the are grooves of the radiation plate.

2. The ultrasonic transducer of claim 1, wherein the are sectors include:

inner are sectors; and outer are sectors provided outside the inner arc sectors.

3. The ultrasonic transducer of claim 1, wherein the number of are sectors is four.

4. The ultrasonic transducer of claim 3, wherein each of the arc sectors has an are angle greater than 15 degrees.

5. The ultrasonic transducer of claim 4, wherein the arc angle is less than 25 degrees.

6. The ultrasonic transducer of claim 4, wherein the arc angle is 20 degrees.

7. The ultrasonic transducer of claim 1, wherein the are holes include:

internal arc holes; and external arc holes outside the internal are holes.

8. The ultrasonic transducer of claim 1, wherein each of the concave-convex grooves has a ring shape.

9. The ultrasonic transducer of claim 1, wherein the concave-convex grooves include:

an internal concave-convex groove; and an external concave-convex groove outside the inner concave-convex groove.

10. The ultrasonic transducer of claim 1, wherein the radiation plate has a propeller shape.

* * * * *